W. F. GOODYEAR.
CARGO NET OF WIRE OR OTHER ROPE.
APPLICATION FILED JUNE 25, 1918.
1,367,249.
Patented Feb. 1, 1921.
2 SHEETS—SHEET 1.
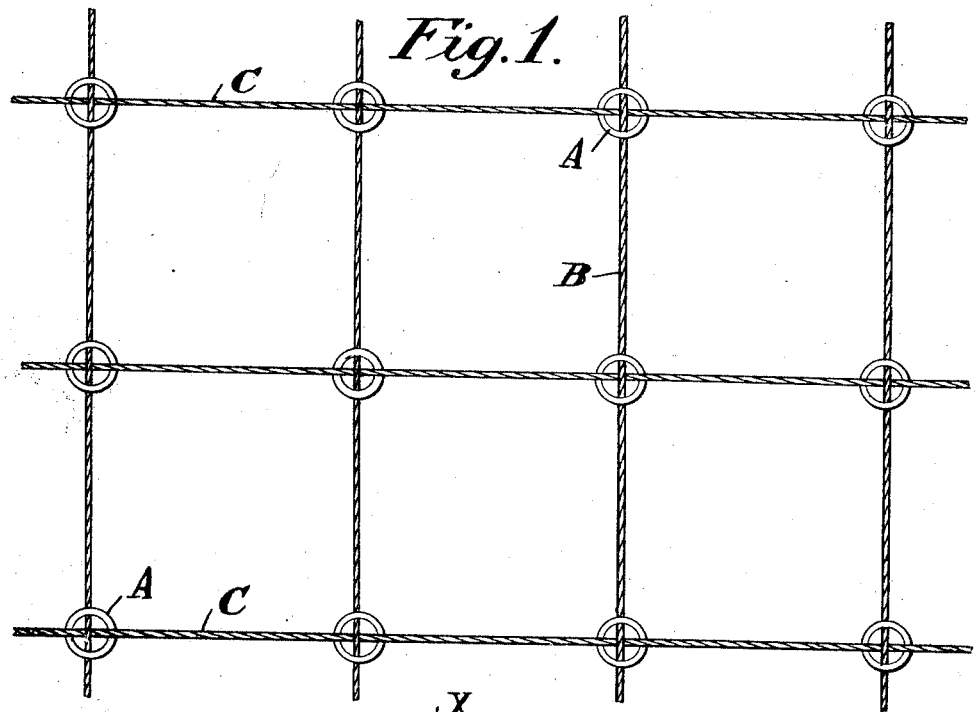
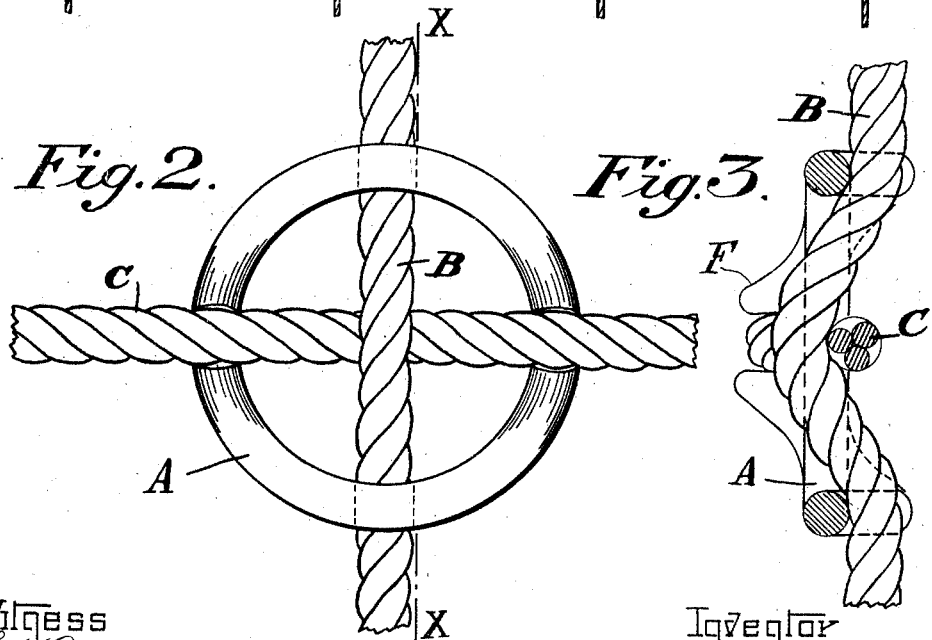
Witness
Inventor
William Frederick Goodyear,
By Dodge and Sons,
Asso. Attorneys.

W. F. GOODYEAR.
CARGO NET OF WIRE OR OTHER ROPE.
APPLICATION FILED JUNE 25, 1918.

1,367,249.

Patented Feb. 1, 1921.
2 SHEETS—SHEET 2.

Witness

Inventor
William Frederick Goodyear
By Dodge and Sons,
Asso. Attorneys.

UNITED STATES PATENT OFFICE.

WILLIAM FREDERICK GOODYEAR, OF LIVERPOOL, ENGLAND.

CARGO-NET OF WIRE OR OTHER ROPE.

1,367,249.  Specification of Letters Patent.  Patented Feb. 1, 1921.

Application filed June 25, 1918. Serial No. 241,848.

*To all whom it may concern:*

Be it known that I, WILLIAM FREDERICK GOODYEAR, a subject of the King of Great Britain, residing at Liverpool, in the county of Lancaster and Kingdom of England, have invented certain new and useful Improvements in Cargo-Nets of Wire or other Rope, of which the following is a specification.

This invention has for its object an arrangement of strong netting applicable for a variety of purposes, such as cargo nets, torpedo nets, nets for catching tuna fish and other still larger denizens of the deep, for submarines and the like.

These nets are composed of hard rings and flexible wire rope but it is just possible that the invention may be useful where extremely flexible metal is substituted for the wire rope though for a different purpose, but I cannot recommend this flexible metal for the purposes herein described.

In wire rope netting at the present time the crossings of the ropes are fastened together, usually by lashings, or else the net is netted in the ordinary manner by a kind of knot. In either case these crossings are rather expensive to make, and the lashings are apt to wear out very quickly.

Now by my invention I make a crossing which will be as immovable under ordinary circumstances as lashings, while at the same time if a strand has to be taken out of a net and another applied, this can be done exceedingly easily.

The invention is best set forth by aid of the accompanying drawings, in which:—

Figure 1 is a general view of a portion of netting with ordinary rings.

Fig. 2 is a plan view of a crossing with rings having projections to guard the rope and Fig. 3 is a view at right angles thereto.

In these A is a ring, and B and C are two ropes crossing at the center point of this ring.

It will be seen that one rope is passed through the ring forcibly pressed around the other rope, and led back through the ring again, and practically tightened so that the two ropes are about equally strained, and this takes place with all the crossings in the netting. I prefer all the rings to be of the type shown in Fig. 1, but in certain cases where it is desirable that there shall not be great points of friction, as where the net is dragged over ground, and therefore it is liable to be considerably worn at the crossings, I form the rings as shown in Figs. 2 and 3 with sloping projections F at each side of the wire rope where it presses against them, the projections being as high or somewhat higher than the thickness of the wire rope so that when it is drawn over the ground or against other objects the wear shall come upon the rings and for this purpose the rings are made of hardened steel. Only circular rings are shown but it is obvious that the exact contour is immaterial as square and other shaped rings could be used equally well.

Figure 4:
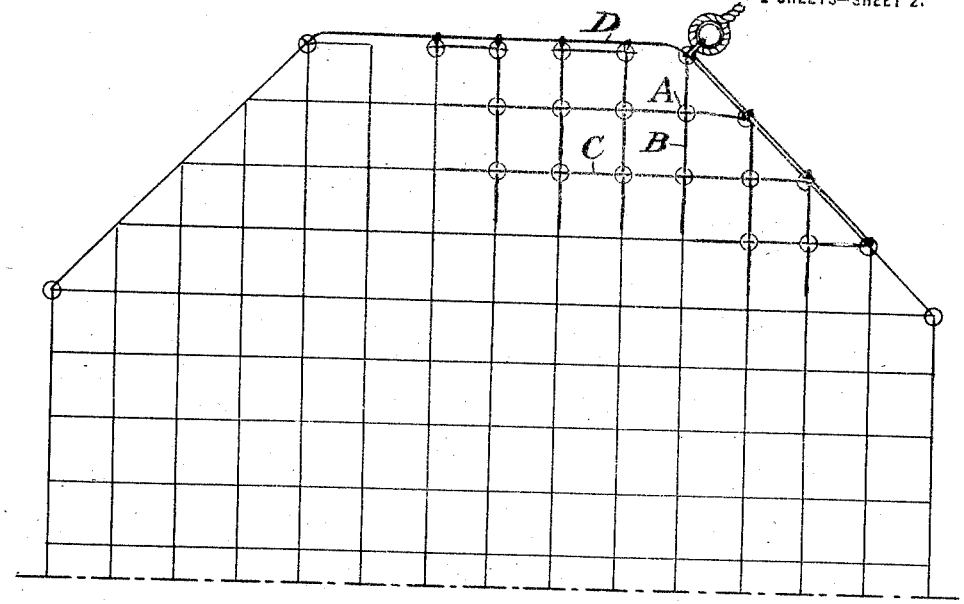
Fig. 4 is a plan of a complete net.
Figure 5:
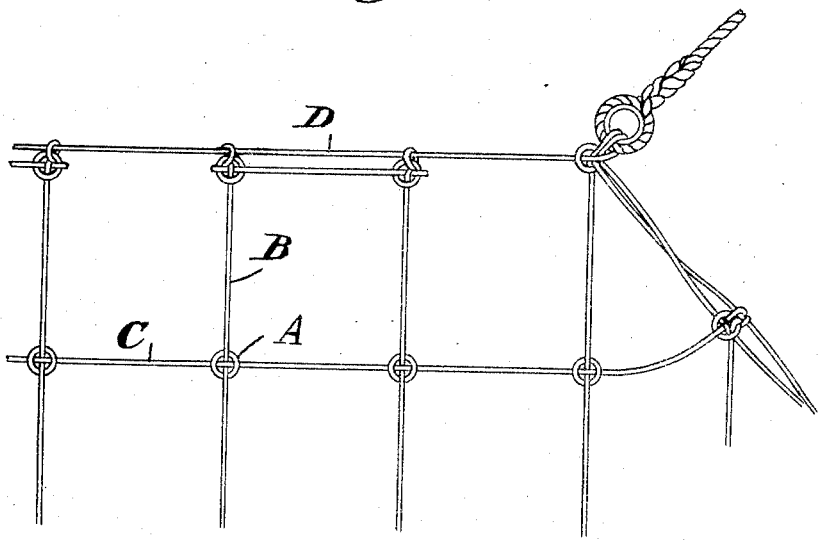
Fig. 5 is a view of part of same on a larger scale.

Referring now to Figs. 4 and 5, I first of all lay down the outside boundary rope D, I then commence the interlacing B and afterward C at the center. Beginning at the middle of the net the rope crosses to the boundary rope to which it is secured by means of a ring as shown in Fig. 5. It then passes alongside the boundary rope at the distance of one mesh and is again secured by a ring, then across the net to the opposite boundary and so on till the whole net is laced. The rings are threaded on the interlacing rope to the required number as the work proceeds. When the rope B is thus laced the rope C is laced at right angles thereto the rings being placed at the crossings.

I declare that what I claim is:—

1. A net comprising in combination a plurality of strands of wire rope crossing each other and a plurality of hard, rigid lock rings, one for each point of crossing of the ropes, the ropes at the point of crossing passing on opposite faces of the lock ring and being deflected within the ring, passing each other on the side opposite the side contacting with the ring, the rings being of such internal diameter with reference to the rope as to produce a permanent clamping action upon the rope, substantially as described.

2. A net comprising, in combination, a plurality of strands of wire rope crossing each other, and a plurality of hard, rigid lock rings, one for each point of crossing of the ropes, said rings being formed with projecting grooves deeper than the thickness of the rope on their opposite faces, the ropes at the intersection lying within said grooves and on opposite faces of said ring, the ropes being deflected within the rings and passing each other on the side opposite the side contacting with the ring, and the rings being of such internal diameter with reference to the size of the rope as to produce permanent frictional engagement between the rings and rope.

In witness whereof I have hereunto signed my name this 31st day of May, 1918, in the presence of two subscribing witnesses.

WILLIAM FREDERICK GOODYEAR.

Witnesses:
 MYLES HAILES,
 HAROLD I. JACKSON.